United States Patent Office.

WILLIAM JOHN HAY, OF LYMINGTON LODGE, SOUTHSEA, ENGLAND.

Letters Patent No. 61,064, dated January 8, 1867.

IMPROVED COMPOSITION FOR COATING SHIPS' BOTTOMS.

The Schedule referred to in these Letters Patent and making part of the same.

TO ALL TO WHOM THESE PRESENTS SHALL COME:

Be it known that I, WILLIAM JOHN HAY, of Southsea, in the county of Hants, experimental chemist, have made an invention for "Improvements in Protecting Iron and Wooden Ships, Caissons, Dams, and other Wooden or Iron Structures from Decay and from Fouling by Vegetable and Animal Matters, and in preparing the materials employed therein." Now know ye that I, the said WILLIAM JOHN HAY, do hereby declare the nature of my said invention, and in what manner the same is to be performed, to be particularly described and ascertained in and by the following statement thereof; that is to say—

My invention consists of an improved method of treating the oxides of copper and other metals, to prevent the uncertainty of their action by imperfect or not uniform application when used for keeping ships' bottoms or other structures free from animalculæ and other animal and vegetable matters; also, when used to preserve woods and other materials from decay and the ravages of insects. For which purposes I grind in linseed oil the black or protoxide of copper, and then boil it with linseed oil until it is reduced to the sub-oxide, and by thus oxidizing and oxidating the oil I form a quick-drying cupreous oil, which suspends the oxide in the form of a paint or varnish. To this I sometimes add a small portion of silver or other metals and oxides. In those cases where greater durability is required from ships being in foreign stations, or not able to be docked periodically, I add to the above-mentioned paint an additional quantity of finely ground sub-oxide of copper, or, when the paint is required to be black, I add the black oxide of copper in the same manner. The paint or varnish may be thinned by spirits of turpentine, naphtha, or any other cheap spirits. When it is to be applied to iron, one or two protective or non-conducting coats should be first applied. This may be red or white lead, paint, or asphalte varnish, or water-proof glue in its liquid state, or other suitable material. My invention also consists in the use of zinc, either amalgamated or not, in contact with the inside or outside of iron vessels, ships, iron casings, and other structures, as a protection against electro-chemical action arising from any imperfect application of the protective varnish, paint, or other material, or from the accidental abrasion of the said protective coatings or otherwise.

And having now described the nature of my said invention, and in what manner the same is to be performed, I wish it to be understood that the zinc or varnish hereinbefore described may be used independently of the zinc; also that the zinc may be employed with other materials than those first herein described; and I declare that I claim—

1. Protecting iron and wooden ships, caissons, dams, and other wooden or iron structures from decay and from fouling, by coating or covering the same with the materials and in the manner hereinbefore described. And 2. Preparing the materials for the purposes aforesaid in the manner hereinbefore described.

In witness whereof I, the said WILLIAM JOHN HAY, have hereunto set my hand and seal this twelfth day of May, one thousand eight hundred and sixty-two.

The above specification of my invention signed by me this 23d day of January, 1866.

WILLIAM JOHN HAY.

Witnesses:
THOMAS LAKE, } London, No. 17 Grace-Church street.
THOS. BROWN. }
JOHN HARRISON, Notary Public.